US011265944B1

(12) United States Patent
Marupaduga

(10) Patent No.: US 11,265,944 B1
(45) Date of Patent: Mar. 1, 2022

(54) SIMULTANEOUS WIRELESS DATA COMMUNICATION OVER FIFTH GENERATION NEW RADIO (5GNR) AND LONG TERM EVOLUTION (LTE)

(71) Applicant: T-MOBILE INNOVATIONS LLC, Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 109 days.

(21) Appl. No.: 16/736,072

(22) Filed: Jan. 7, 2020

(51) Int. Cl.
| | | |
|---|---|---|
| H04W 56/00 | (2009.01) | |
| H04W 76/16 | (2018.01) | |
| H04L 5/00 | (2006.01) | |
| H04L 1/18 | (2006.01) | |
| H04W 80/02 | (2009.01) | |
| H04W 80/08 | (2009.01) | |

(52) U.S. Cl.
CPC .......... *H04W 76/16* (2018.02); *H04L 1/1896* (2013.01); *H04L 5/006* (2013.01); *H04W 80/02* (2013.01); *H04W 80/08* (2013.01)

(58) Field of Classification Search
CPC ..... H04W 76/16; H04W 80/08; H04W 80/02; H04L 1/1896; H04L 5/006
USPC ........................................................ 370/329
See application file for complete search history.

(56) References Cited

U.S. PATENT DOCUMENTS

| | | | |
|---|---|---|---|
| 10,485,048 B2 | 11/2019 | Zeng et al. | |
| 2013/0242909 A1* | 9/2013 | Kim ....................... | H04W 72/08 370/329 |
| 2015/0181534 A1* | 6/2015 | Andersson .......... | H04W 72/042 370/311 |
| 2017/0257183 A1* | 9/2017 | Vikberg ................ | H04L 1/0001 |
| 2018/0212694 A1* | 7/2018 | Jheng ..................... | H04W 76/20 |
| 2019/0069325 A1 | 2/2019 | Yerramalli et al. | |
| 2019/0238256 A1 | 8/2019 | Xing et al. | |
| 2019/0320322 A1 | 10/2019 | Jayawardene et al. | |
| 2020/0404559 A1* | 12/2020 | Koskela ................ | H04W 36/36 |
| 2021/0006998 A1* | 1/2021 | Xu ....................... | H04B 17/309 |

FOREIGN PATENT DOCUMENTS

| | | |
|---|---|---|
| WO | 2018219099 A1 | 12/2018 |
| WO | 2018231525 A1 | 12/2018 |

* cited by examiner

*Primary Examiner* — Sai Ming Chan

(57) ABSTRACT

A wireless access node simultaneously serves wireless User Equipment (UE) over Fifth Generation New Radio (5GNR) and Long Term Evolution (LTE). A baseband unit splits user data into a 5GNR portion and an LTE portion per a dynamic 5GNR/LTE split. A 5GNR radio wirelessly transfers the 5GNR portion to the wireless UE. An LTE radio wirelessly transfers the LTE portion to the wireless UE. The baseband unit corrects LTE and 5GNR transmission errors and determines a 5GNR Block Error Rate (BLER) and an LTE BLER. The baseband unit modifies the dynamic 5GNR/LTE split based on the difference between the 5GNR BLER and the LTE BLER. The baseband unit splits additional user data into 5GNR and LTE portions per the modified 5GNR/LTE split.

20 Claims, 7 Drawing Sheets

SIMULTANEOUS WIRELESS DATA COMMUNICATION OVER FIFTH GENERATION NEW RADIO (5GNR) AND LONG TERM EVOLUTION (LTE)

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

Some wireless user devices are configured to operate in a dual-connectivity mode where the wireless user device and the wireless access node use two radios to simultaneously exchange user data over parallel wireless links. For example, a wireless user device and a wireless access node may simultaneously communicate at the same time over an LTE link and a 5GNR link. The wireless access node often splits the user data into an LTE portion and a 5GNR portion and then transfers the LTE portion over the LTE link and transfers the 5GNR portion over the 5GNR link. The split may be static and even like 50% LTE and 50% 5GNR. The split may be dynamic and uneven like a 5GNR-heavy split (10% LTE and 90% 5GNR) that changes to an LTE-heavy split (90% LTE and 10% 5GNR). The wireless access node dynamically modifies the dynamic split based on radio metrics like buffer fill and signal strength.

The wireless access node and the wireless user device also perform error correction for their wireless transmissions. The transmitter calculates a parity value for a data block and adds the parity value to the data packet that transports the data block. The receiver recalculates the parity value for the data block and compares the recalculated parity value to the transferred parity value to validate the data block. The receiver acknowledges valid data blocks to the transmitter, and the transmitter usually resends data blocks that are not acknowledged. The transmitter and receiver also use sequence numbering to detect missing data blocks, and the receiver requests the re-transmission of any missing data blocks. The ratio of invalid or missing data blocks to the total amount of data blocks is referred to as the Block Error Rate (BLER). Common forms of block error correction include Automatic Repeat Request (ARQ) and Hybrid Automatic Repeat Request (HARQ).

Unfortunately, the wireless access nodes do not effectively use BLER to dynamically control their splits when using dual-connectivity. Moreover, the wireless access nodes do not efficiently compare dual-connectivity BLERs to dynamically control the dual-connectivity splits.

TECHNICAL OVERVIEW

A wireless access node simultaneously serves a wireless User Equipment (UE) over Fifth Generation New Radio (5GNR) and Long Term Evolution (LTE). A baseband unit splits user data into a 5GNR portion and an LTE portion per a dynamic 5GNR/LTE split. A 5GNR radio wirelessly transfers the 5GNR portion to the wireless UE. An LTE radio wirelessly transfers the LTE portion to the wireless UE. The baseband unit corrects LTE and 5GNR transmission errors and determines a 5GNR Block Error Rate (BLER) and an LTE BLER. The baseband unit modifies the dynamic 5GNR/LTE split based on the difference between the 5GNR BLER and the LTE BLER. The baseband unit splits additional user data into 5GNR and LTE portions per the modified 5GNR/LTE split.

DETAILED DESCRIPTION

Figure 1:
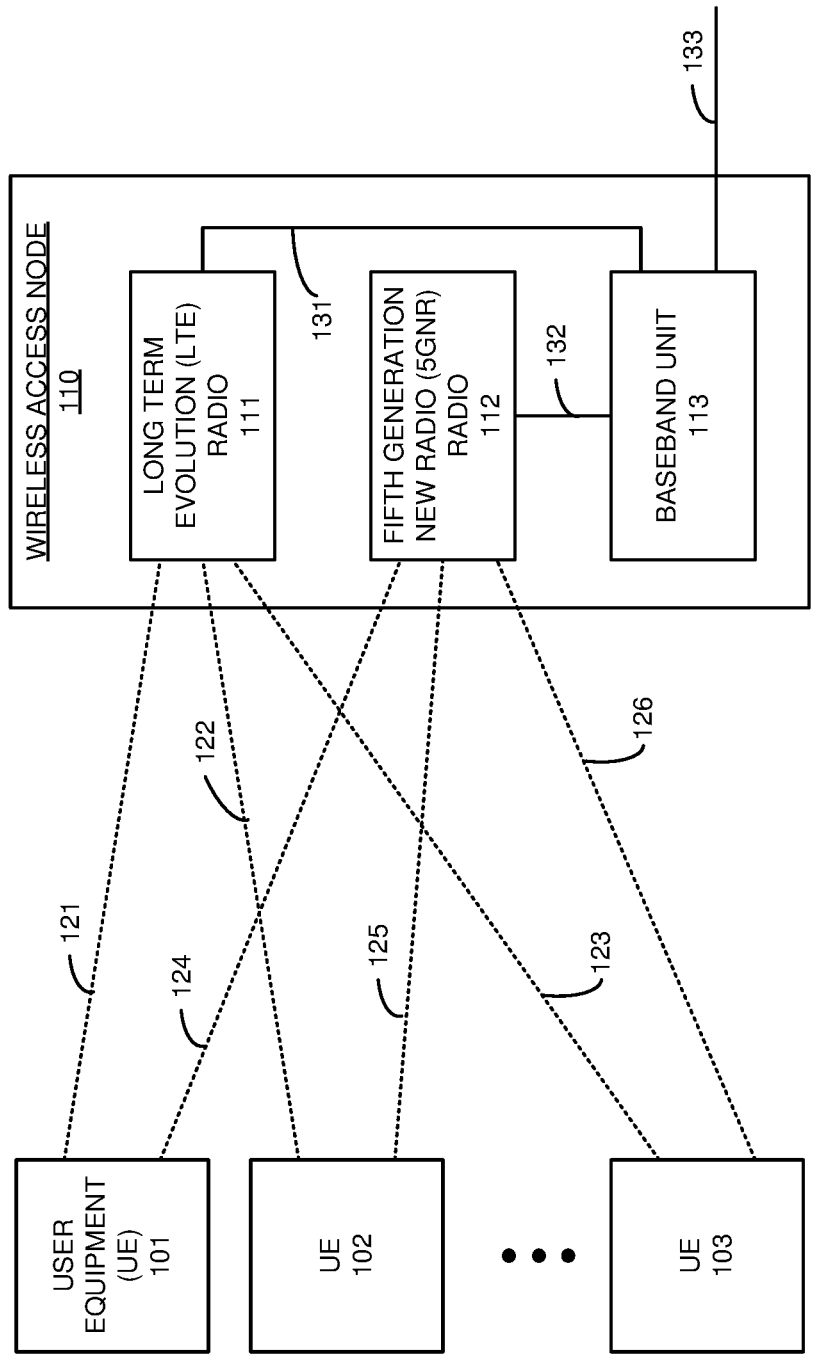
FIG. 1 illustrates a wireless access node that simultaneously serves wireless User Equipment (UEs) over Fifth Generation New Radio (5GNR) and Long Term Evolution (LTE).

FIG. 1 illustrates wireless access node 110 that simultaneously serves wireless User Equipment (UEs) 101-103 over Fifth Generation New Radio (5GNR) and Long Term Evolution (LTE). Wireless access node 110 serves UEs 101-103 with wireless data services like internet-access, messaging, conferencing, machine-control, or some other wireless networking product. UEs 101-103 might be phones, computers, robots, vehicles, or some other data appliances with wireless communication circuitry.

Wireless access node 110 comprises LTE radio 111, 5GNR radio 112, and baseband unit 113. Wireless UEs 101-103 and LTE radio 111 are wirelessly linked over respective LTE links 121-123. Wireless UEs 101-103 and 5GNR radio 112 are wirelessly linked over respective 5GNR links 124-126. Baseband unit 113 and radios 111-112 are coupled over respective data communication links 131-132 like Common Public Radio Interface (CPRI). Baseband unit 113 and other network elements are coupled over backhaul links 133. The LTE and 5GNR links use electromagnetic frequencies in the low-band, mid-band, high-band, or some other part of the electromagnetic spectrum. The backhaul links may use Institute of Electrical and Electronic Engineers (IEEE) 802.3 (Ethernet), Time Division Multiplex (TDM), Data Over Cable System Interface Specification (DOCSIS), Internet Protocol (IP), 5GNR, Long Term Evolution (LTE), IEEE 802.11 (WIFI), or some other data communication protocol.

Radios 111-112 comprise antennas, filters, amplifiers, analog-to-digital interfaces, microprocessors, memory, software, transceivers, bus circuitry, and the like. Baseband unit 113 comprises microprocessors, memory, software, transceivers, and bus circuitry, and the like. The microprocessors comprise Digital Signal Processors (DSP), Central Processing Units (CPUs), Graphical Processing Units (GPUs), Application-Specific Integrated Circuits (ASICs), Field Programmable Gate Arrays (FPGAs), and/or the like. The memories comprise Random Access Memory (RAM), flash circuitry, disk drives, and/or the like. The memories store software like operating systems and network applications.

In operation, baseband unit 113 receives user data for delivery to wireless UEs 101-103. Baseband unit 113 splits the user data into a 5GNR portion and an LTE portion per a 5GNR/LTE split. Baseband unit 113 transfers the LTE portion of the user data to LTE radio 111 over data link 131. Baseband unit 113 transfers the 5GNR portion of the user data to 5GNR radio 112 over data link 132. LTE radio 111 wirelessly transfers the LTE portion of the user data to wireless UEs 101-103 over LTE links 121-123. 5GNR radio 112 wirelessly transfers the 5GNR portion of the user data to wireless UEs 101-103 over 5GNR links 124-126.

Baseband unit 113 and UEs 101-103 correct errors in the LTE transmissions per an LTE Block Error Rate (BLER). Baseband unit 113 and UEs 101-103 correct errors in the 5GNR transmissions per a 5GNR BLER. For example, baseband unit 113 may calculate parity values for data blocks and add the parity values to the data packets that transport the data blocks. UEs 101-103 receive the data packets and recalculate the parity values for the data blocks. UEs 101-103 compare the recalculated parity values to the transferred parity values to validate the data blocks. UEs 101-103 acknowledge valid data blocks to baseband unit 113, and baseband unit 113 usually resends data blocks that are not acknowledged. Baseband unit 113 and UEs 101-103 also use sequence numbering to detect missing data blocks, and UEs 101-103 request the re-transmission of any missing data blocks. The ratio of invalid or missing data blocks to the total amount of data blocks is referred to as the BLER. Common forms of block error correction include Automatic Repeat Request (ARQ) and Hybrid Automatic Repeat Request (HARD).

Baseband unit 113 determines the difference between the 5GNR BLER the LTE BLER. Baseband unit 113 modifies the 5GNR/LTE split based on the difference between the 5GNR BLER and the LTE BLER. Baseband unit 113 receives additional user data for delivery to wireless UEs 101-103. Baseband unit 113 splits the additional user data into a new 5GNR portion and a new LTE portion per the modified 5GNR/LTE split. Baseband unit 113 transfers the new LTE portion of the additional user data to LTE radio 111 over data link 131. Baseband unit 113 transfers the new 5GNR portion of the additional user data to 5GNR radio 112 over data link 132. LTE radio 111 wirelessly transfers the new LTE portion of the additional user data to wireless UEs 101-103 over LTE links 121-123. 5GNR radio 112 wirelessly transfers the new 5GNR portion of the additional user data to wireless UEs 101-103 over 5GNR links 124-126.

Baseband unit 113 makes the 5GNR/LTE split more even (toward 50% LTE and 50% 5GNR) when the difference between the 5GNR BLER and the LTE BLER decreases. Baseband unit 113 makes the 5GNR/LTE split less even when the difference between the 5GNR BLER and the LTE BLER increases. When the difference between the LTE BLER and the 5GNR BLER increases, baseband unit 113 increases the 5GNR portion of the split when the 5GNR BLER is lower than the LTE BLER, and baseband unit 113 increases the LTE portion of the split when the 5GNR BLER is higher than the LTE BLER.

Advantageously, wireless access node 110 effectively uses BLER to dynamically control the LTE/5GNR split when using LTE/5GNR dual-connectivity. Moreover, wireless access node 110 efficiently compares LTE BLER with 5GNR BLER to dynamically control the LTE/5GNR splits. This dynamic split control has the technical effect of reducing wireless transmission errors. The reduction in wireless transmission errors has the technical effect of improving the spectral efficiency. The gain in spectral efficiency improves wireless communication service quality while lowering wireless communication service costs.

Figure 2:
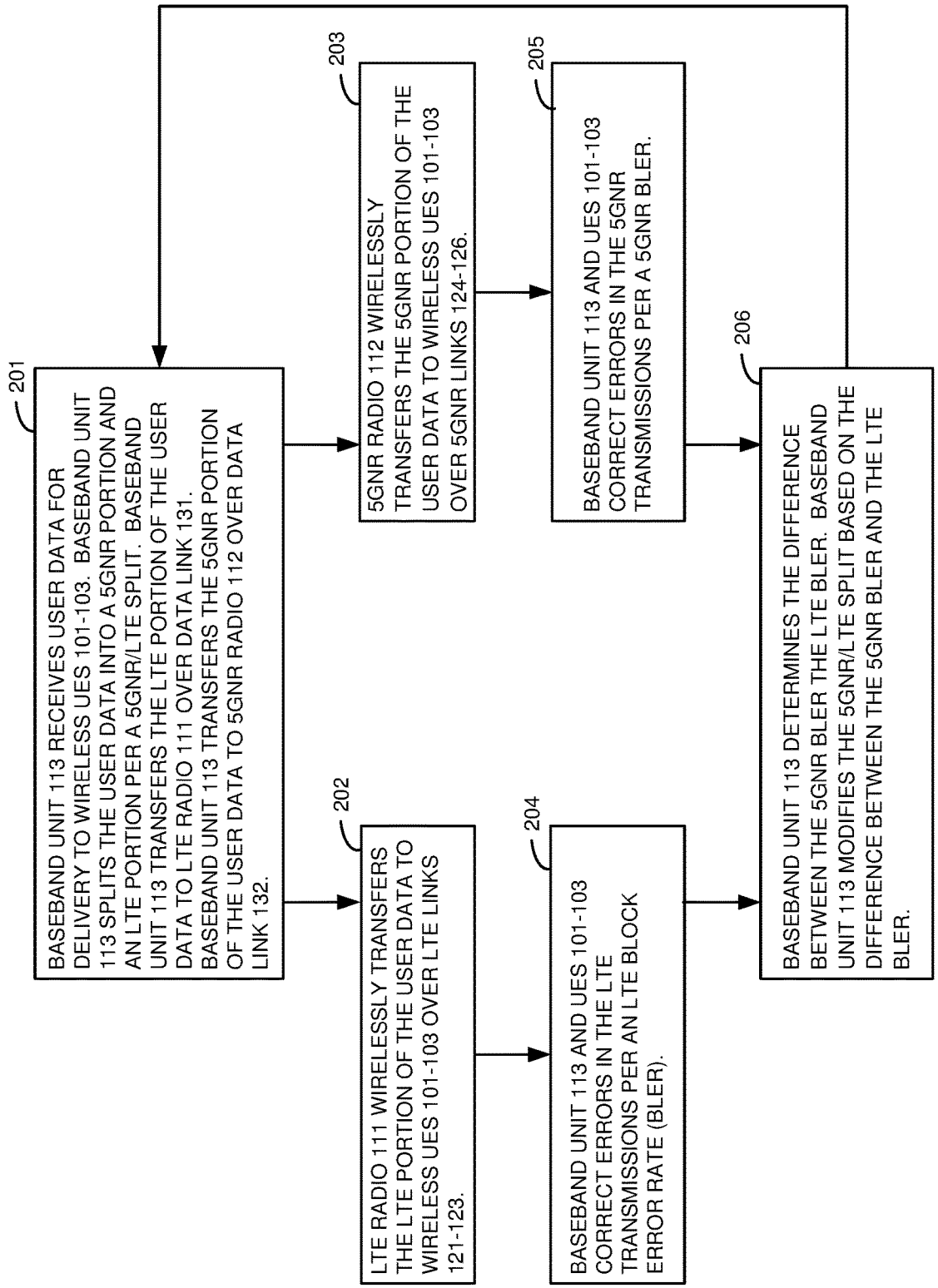
FIG. 2 illustrates the operation of the wireless access node to simultaneously serve the wireless UEs over 5GNR and LTE.

FIG. 2 illustrates the operation of wireless access node 110 to simultaneously serve wireless UEs 101-103 over 5GNR and LTE. Baseband unit 113 receives user data for delivery to wireless UEs 101-103 (201). Baseband unit 113 splits the user data into a 5GNR portion and an LTE portion per a 5GNR/LTE split. Baseband unit 113 transfers the LTE portion of the user data to LTE radio 111 over data link 131. Baseband unit 113 transfers the 5GNR portion of the user data to 5GNR radio 112 over data link 132. LTE radio 111 wirelessly transfers the LTE portion of the user data to wireless UEs 101-103 over LTE links 121-123 (202). 5GNR radio 112 wirelessly transfers the 5GNR portion of the user data to wireless UEs 101-103 over 5GNR links 124-126 (203). Baseband unit 113 and UEs 101-103 correct errors in the LTE transmissions per an LTE BLER (204). Baseband unit 113 and UEs 101-103 correct errors in the 5GNR transmissions per a 5GNR BLER (205). Baseband unit 113 determines the difference between the 5GNR BLER the LTE BLER (206). Baseband unit 113 modifies the 5GNR/LTE split based on the difference between the 5GNR BLER and the LTE BLER (206). The process repeats with the new 5GNR/LTE split (201).

Figure 3:
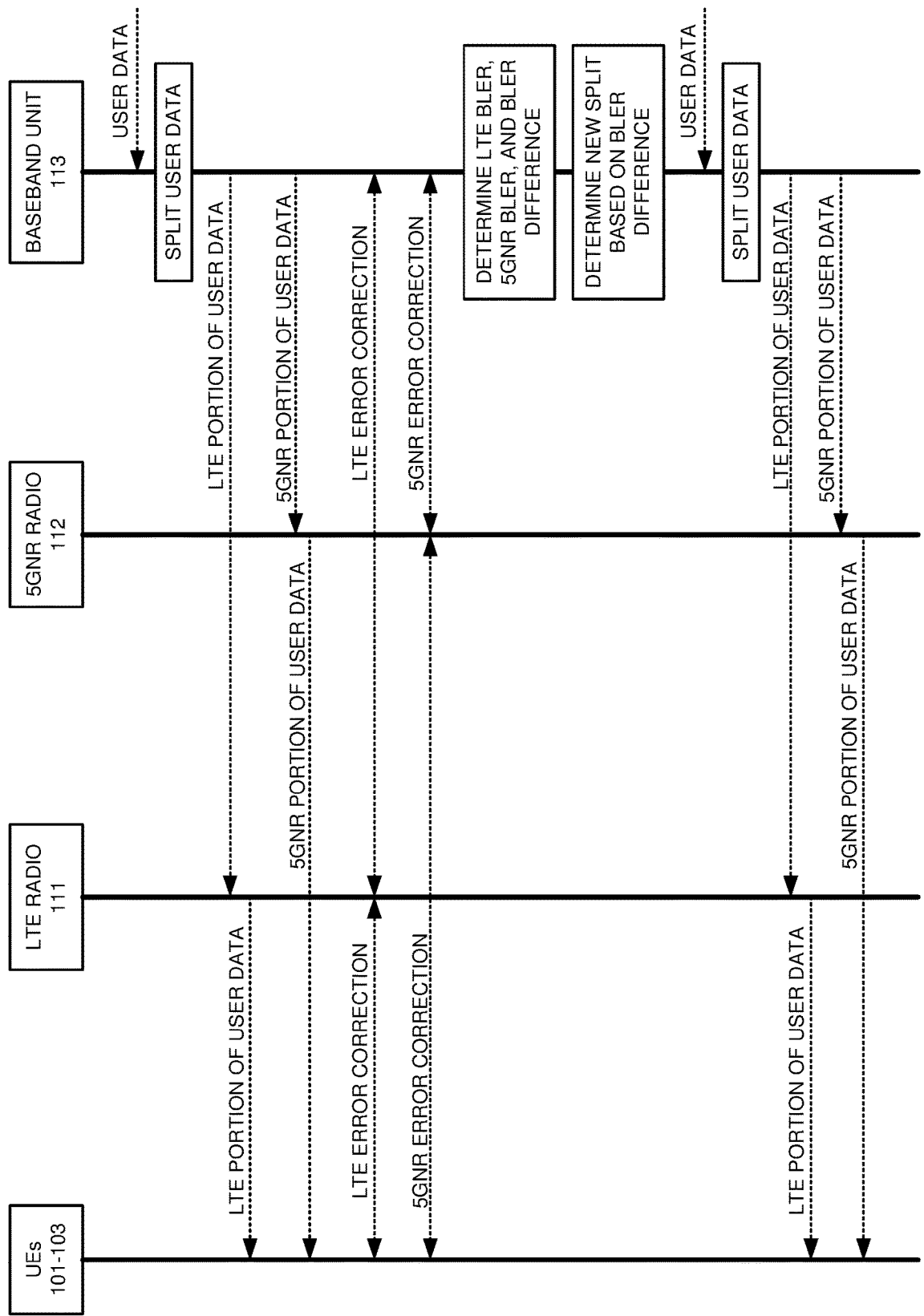
FIG. 3 illustrates the operation of the wireless access node to simultaneously serve the wireless UEs over 5GNR and LTE.

FIG. 3 illustrates the operation of wireless access node 110 to simultaneously serve wireless UEs 101-103 over 5GNR and LTE. Baseband unit 113 receives user data for delivery to wireless UEs 101-103. Baseband unit 113 splits the user data into a 5GNR portion and an LTE portion per a 5GNR/LTE split. Baseband unit 113 transfers the LTE portion of the user data to LTE radio 111. LTE radio 111 wirelessly transfers the LTE portion of the user data to wireless UEs 101-103. Baseband unit 113 transfers the 5GNR portion of the user data to 5GNR radio 112. 5GNR radio 112 wirelessly transfers the 5GNR portion of the user data to wireless UEs 101-103. Baseband unit 113 and UEs 101-103 correct errors in the LTE transmissions, and baseband unit 113 determines the LTE BLER. Baseband unit 113 and UEs 101-103 correct errors in the 5GNR transmissions, and baseband unit 113 determines the 5GNR BLER.

Baseband unit 113 determines the difference between the 5GNR BLER and the LTE BLER. Baseband unit 113 modifies the 5GNR/LTE split based on the difference between the 5GNR BLER and the LTE BLER. Baseband unit 113 makes the 5GNR/LTE split more even when the difference between the 5GNR BLER and the LTE BLER decreases. Baseband unit 113 makes the 5GNR/LTE split less even when the difference between the 5GNR BLER and the LTE BLER increases. Baseband unit 113 increases the 5GNR portion of the split when the 5GNR BLER is lower than the LTE BLER. Baseband unit 113 increases the LTE portion of the split when the 5GNR BLER is higher than the LTE BLER.

Baseband unit 113 receives additional user data for delivery to wireless UEs 101-103. Baseband unit 113 splits the additional user data into a new 5GNR portion and a new LTE portion per the modified 5GNR/LTE split. Baseband unit 113 transfers the new LTE portion of the additional user data to LTE radio 111. LTE radio 111 wirelessly transfers the new LTE portion of the additional user data to wireless UEs 101-103. Baseband unit 113 transfers the new 5GNR portion of the additional user data to 5GNR radio 112. 5GNR radio 112 wirelessly transfers the new 5GNR portion of the additional user data to wireless UEs 101-103.

Figure 4:
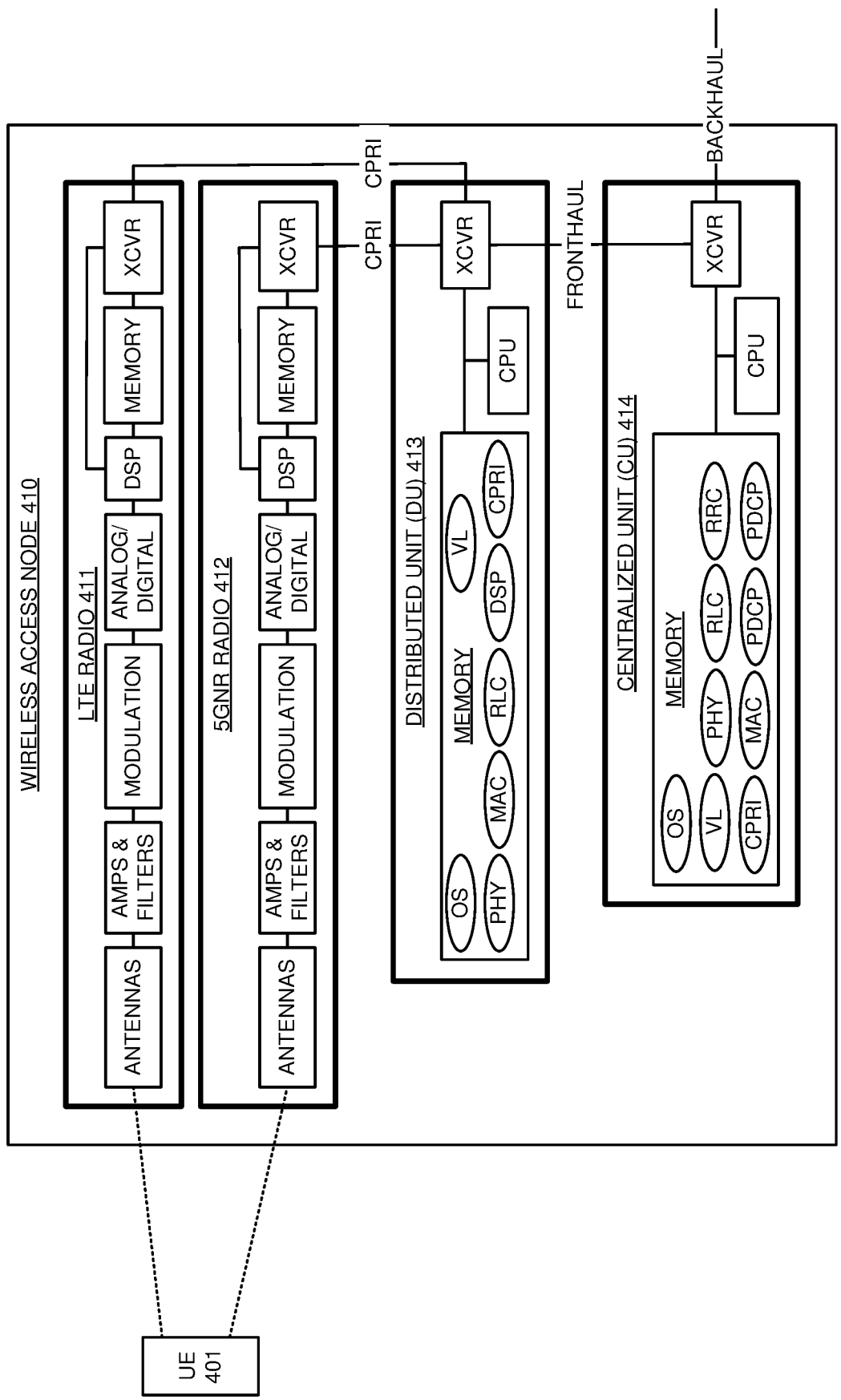
FIG. 4 illustrates a wireless access node having a baseband unit that simultaneously serves a wireless UE over a 5GNR radio and an LTE radio.

FIG. 4 illustrates wireless access node 410 having baseband unit 413 that simultaneously serves wireless UE 401 over LTE radio 411 and 5GNR radio 412. Wireless access node 410 is an example of wireless access node 110, although node 110 may differ. Wireless access node 410 comprises LTE radio 411, 5GNR radio 412, Distributed Unit (DU) 413, and Centralized Unit (CU) 414. LTE radio 411 comprises antennas, amplifiers (AMPS), filters, modulation, analog-to-digital interfaces, DSP, and memory that are coupled over bus circuitry. 5GNR radio 412 comprises antennas, amplifiers, filters, modulation, analog-to-digital interfaces, DSP, and memory that are coupled over bus circuitry. Radios 411-412 may share some components like antennas. DU 413 comprises memory, Central Processing Units (CPU), and Transceivers (XCVR) that are coupled over bus circuitry. CU 414 comprises memory, CPU, and XCVR that are coupled over bus circuitry.

UE 401 is wirelessly coupled to the antennas in LTE radio 411 and 5GNR radio 412. The XCVR in radio 411 and the XCVR in radio 412 are coupled to the XCVR in DU 413 over Common Public Radio Interface (CPRI) links. The XCVR in DU 413 is coupled to the XCVR in CU 414 over fronthaul links. The XCVR in CU 414 is coupled to packet gateways and network controllers over backhaul links.

In DU 413, the memory stores operating system (OS), virtual layer (VL), and several network applications like 5GNR Physical Layer (PHY), 5GNR Media Access Control (MAC), 5GNR Radio Link Control (RLC), 5GNR DSP application (DSP), and 5GNR/LTE Common Public Radio Interfaces (CPRI). In CU 414 memory 422 stores an operating system, virtual layer, and several network applications like LTE PHY, LTE MAC, LTE RLC, 5GNR/LTE Packet Data Convergence Protocols (PDCPs), and LTE Radio Resource Control (RRC). The virtual layers comprise hypervisors, virtual switches, virtual CPUs, virtual memory and/or the like. The CPU in CU 414 executes the network applications to drive the exchange of user data and network signaling between the network elements and DU 413. The CPU in DU 413 executes the network applications to drive the exchange of user data and network signaling between CU 414 and radios 411-412. Radios 411-412 exchange user data and network signaling with DU 413. Radios 411-412 wirelessly exchange user data and network signaling with UE 401 over the LTE links and the 5GNR links. Radios 411-412 use Multiple Input Multiple Output (MIMO).

In radios 411-412, the antennas receive wireless signals from UE 401 that transport the Uplink (UL) LTE/5GNR signaling and data. The antennas transfer corresponding electrical UL signals through duplexers to the amplifiers. The amplifiers boost the received UL signals for filters which attenuate unwanted energy. In modulation, demodulators down-convert the UL signals from their carrier frequency. The analog/digital interfaces convert the analog UL signals into digital UL signals for the DSPs. The DSPs recover UL LTE/5GNR symbols from the UL digital signals. In DU 413 and CU 414, the CPUs execute the network applications to process the UL symbols and recover the UL LTE/5GNR signaling and data. In CU 414, the CPU 473 executes the LTE RRC to generate corresponding UL S1-MME signaling and DL LTE/5GNR signaling. CU 414 transfers the UL S1-MME signaling to Mobility Management Entity (MME) over the backhaul links. CU 414 transfers the UL data to Serving Gateways (SGWs) over the backhaul links.

In CU 414, the XCVR receives DL S1-MME signaling from the MME and DL data from the SGW. In CU 414 and DU 413, the CPUs execute the network applications to generate corresponding DL signaling and data. In CU 414 and DU 413, the CPUs execute the network applications to process the DL signaling and data to generate DL 5GNR/LTE symbols that carry the DL signaling and data. In radios 411-412, the DSPs processes the DL symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR/LTE signals that transport the DL signaling and data to UE 401.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), MIMO, user identification, random access, user scheduling, and QoS. PHY functions comprise MIMO, packet formation/deformation, windowing/de-windowing, guard-insertion/guard-deletion, parsing/de-parsing, control insertion/removal, interleaving/de-interleaving, Forward Error Correction (FEC) encoding/decoding, rate matching/dematching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In operation, the 5GNR PDCP in CU 414 receives user data from the backhaul links for delivery to wireless UE 401. The 5GNR PDCP in CU 414 splits the user data into a 5GNR portion and an LTE portion per the current 5GNR/LTE split. The 5GNR PDCP in CU 414 transfers the LTE portion to the LTE RLC in CU 414, and the LTE RLC transfers the LTE portion to UE 401 over: the LTE MAC, LTE PHY, DU 413, LTE radio 411, and the LTE link. The 5GNR PDCP transfers the 5GNR portion to the 5GNR RLC in DU 413, and the 5GNR RLC transfers the 5GNR portion to UE 401 over: the 5GNR MAC, 5GNR PHY, 5GNR radio 412, and the 5GNR link.

The LTE MAC and LTE RLC in UE 401 and in CU 414 correct errors in the LTE transmissions per an LTE BLER. The 5GNR MAC and 5GNR RLC in UE 401 and in DU 413 correct errors in the 5GNR transmissions per a 5GNR BLER. The MACs use HARQ and the RLCs use ARQ. The transmitting MACs and RLCs calculate parity values for data blocks and add the parity values to data packets that transport the data blocks. The receiving MACs and RLCs recalculate the parity values for the data blocks and compare the recalculated parity values to the transferred parity values to validate the data blocks. The receiving MACs and RLCs acknowledge valid data blocks to the transmitting MACs and RLCs. The transmitting MACs and RLCs resend data blocks that are not acknowledged. The MACs and RLCs may also use sequence numbering to detect missing data blocks, and the receiving MACs and RLCs request the re-transmission of missing data blocks. The ratio of invalid and missing data blocks to the total amount of data blocks the BLER.

The 5GNR MAC in DU 413 determines Uplink (UL) 5GNR BLER and Downlink (DL) 5GNR BLER. The LTE MAC in CU 414 determines UL LTE BLER and DL LTE BLER. The LTE and 5GNR RLCs also determine their UL/DL BLERs. The MACs and RLCs transfer signaling to the 5GNR PDCP in CU 414 that indicates: UL 5GNR MAC BLER, UL 5GNR RLC BLER, DL 5GNR MAC BLER, DL 5GNR RLC BLER, UL LTE MAC BLER, UL LTE RLC BLER, DL LTE MAC BLER, and the DL LTE RLC BLER. The UL and/or RLC BLER may not be used in some examples.

The 5GNR PDCP in CU 414 determines the difference between the 5GNR BLER and the LTE BLER. The 5GNR BLER may be an average of the UL/DL MAC/RLC 5GNR BLER, the DL MAC 5GNR BLER, or some other representation the 5GNR BLER. The LTE BLER may be an average of the UL/DL MAC/RLC LTE BLER, the DL MAC LTE BLER, or some other representation the LTE BLER. The difference in the LTE BLER and the 5GNR BLER may derived through subtraction, division, or some other comparative numerical relationship. In some examples, the 5GNR PDCP hosts a data structure that correlates different BLER differences to different LTE/5GNR splits.

The 5GNR PDCP in CU 414 receives more user data from the backhaul links for delivery to wireless UE 401. The 5GNR PDCP splits the user data into a new 5GNR portion and a new LTE portion per the new 5GNR/LTE split. The 5GNR PDCP transfers the new LTE portion to the LTE RLC in CU 414, and the LTE RLC transfers the new LTE portion to UE 401 over: the LTE MAC, LTE PHY, DU 413, LTE radio 411, and the LTE link. The 5GNR PDCP transfers the new 5GNR portion the 5GNR RLC in DU 413, and the 5GNR RLC transfers the new 5GNR portion to UE 401 over: the 5GNR MAC, 5GNR PHY, 5GNR radio 412, and the 5GNR link. The LTE/5GNR MACs/RLCs correct errors in the LTE/5GNR transmissions and report their BLERs to the 5GNR PDCP. The 5GNR PDCP modifies the LTE/5GNR split based on the BLER difference and splits subsequent user data based on the modified-dynamic split. The operation repeats.

The 5GNR PDCP moves the 5GNR/LTE split toward 50% LTE and 50% 5GNR when the difference between the 5GNR BLER and the LTE BLER decreases. The 5GNR PDCP moves the 5GNR/LTE split toward 100% 5GNR when the 5GNR BLER trends lower than the LTE BLER as the BLER difference increases. The 5GNR PDCP moves the 5GNR/LTE split toward 100% LTE when the 5GNR BLER trends is higher than the LTE BLER as the BLER difference increases.

Figure 5:
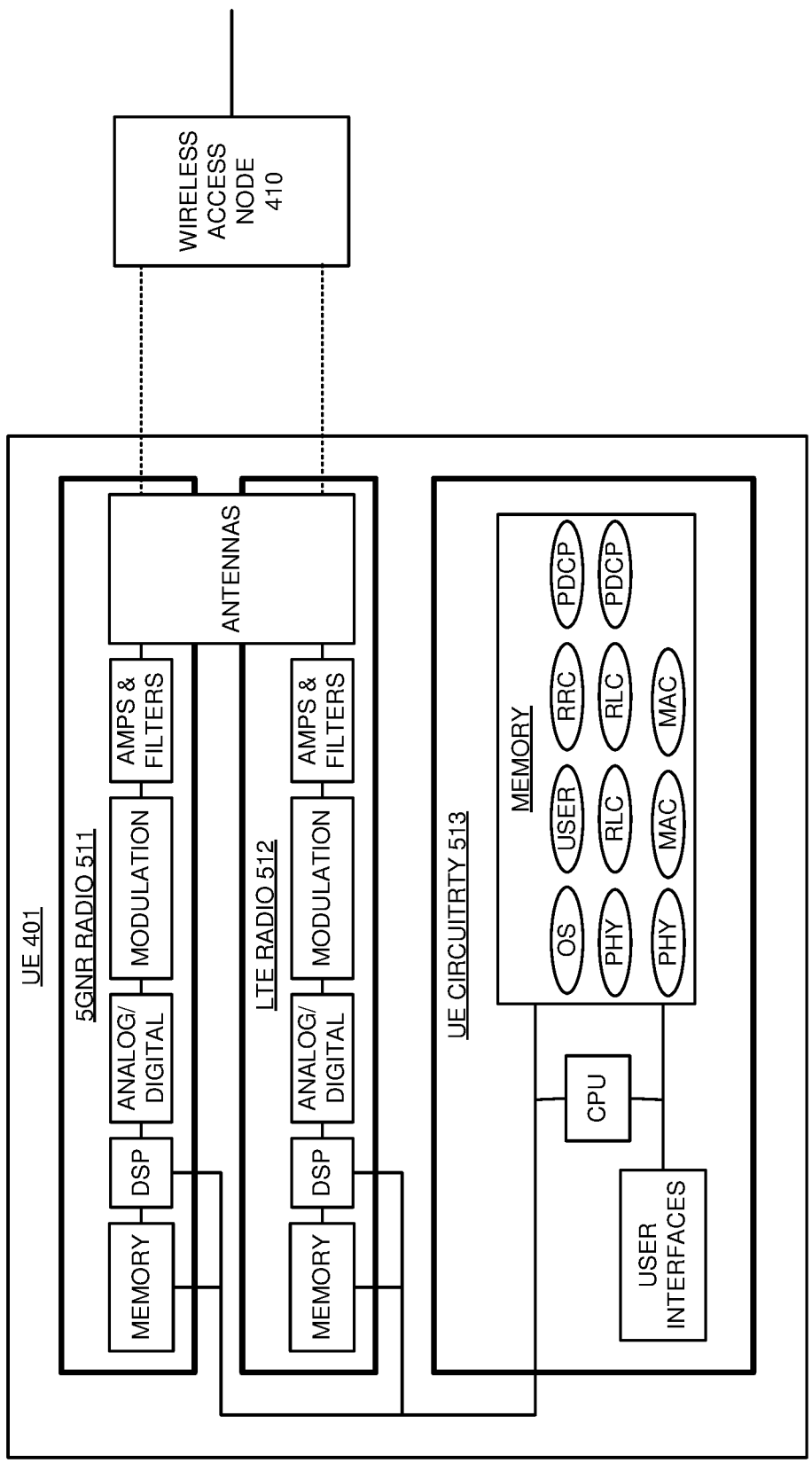
FIG. 5 illustrates the wireless UE that simultaneously uses 5GNR and LTE.

FIG. 5 illustrates wireless UE 401 that simultaneously uses 5GNR and LTE. Wireless UE 401 is an example of UE 101, although UE 101 may differ. UE 401 comprises 5GNR radio 511, LTE radio 512, CPU, memory, and user interfaces which are interconnected over bus circuitry. Radios 511-512 comprise antennas, amplifiers, filters, modulation, analog-to-digital interfaces, DSP, and memory that are coupled over bus circuitry. In this example, radios 511-512 share antennas although radios 511-512 could have their own antennas. The antennas in radios 511-512 are coupled to wireless access node 410 over 5GNR links and LTE links.

The user interfaces comprise graphic displays, machine controllers, sensors, cameras, transceivers, and/or some other user components. The memory stores an operating system, user applications, and network applications. The network applications comprise 5GNR/LTE PHYs, 5GNR/LTE MACs, 5GNR/LTE RLCs, 5GNR/LTE PDCPs, and LTE RRCs. The CPU executes the operating system and LTE network applications to exchange LTE signaling and data with wireless access node 410 over LTE radio 512 and the LTE links. The CPU executes the operating system and 5GNR network applications to exchange 5GNR signaling with and receive 5GNR data from wireless access node 410 over 5GNR radio 511 and the 5GNR links. The 5GNR MAC and RLC perform HARQ and ARQ on the UL/DL at UL/DL 5GNR BLERs. The LTE MAC and RLC perform HARQ and ARQ on the UL/DL at UL/DL LTE BLERs.

Figure 6:
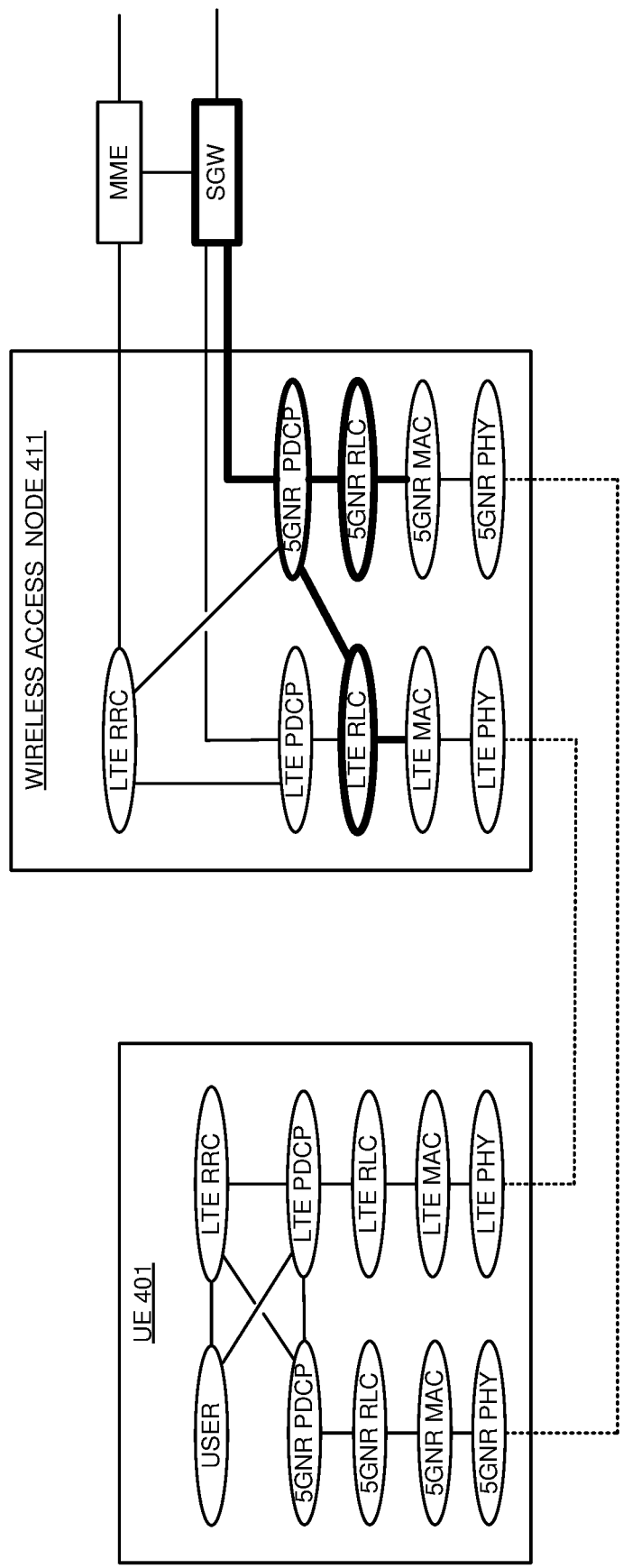
FIG. 6 illustrates the operation of the baseband unit in the wireless access node to simultaneously serve the wireless UE over the 5GNR radio and the LTE radio.

FIG. 6 illustrates the operation of wireless access node 410 to simultaneously serve wireless UE 401 over 5GNR and LTE. In UE 401, the user application exchanges user signaling with the LTE RRC. The LTE RRC in UE 401 exchanges corresponding LTE signaling with the LTE RRC in wireless access node 410 over their LTE PDCPs, RLCs, MACs, PHYs, and an LTE link. The LTE RRC in wireless access node 410 exchanges S1-MME signaling with the Mobility Management Entity (MME), and the MME exchanges S11 signaling with the SGW.

After the signaling exchange, the user application exchanges user data with the LTE PDCP in UE 401. The LTE PDCP in UE 401 exchanges the user data with the LTE PDCP in wireless access node 410 over their LTE RLCs, MACs, PHYs, and the LTE link. The LTE PDCP in wireless access node 410 exchanges the user data with the SGW, and the SGW exchanges the user data with other data systems.

In the above user data exchange, the SGW transfers user data to the 5GNR PDCP in wireless access node 410 for delivery to UE 401. The 5GNR PDCP in wireless access node 410 splits the user data from the SGW into a 5GNR portion and an LTE portion per a dynamic 5GNR/LTE split. In wireless access node 410, the 5GNR PDCP in transfers the 5GNR portion of the user data to the 5GNR PDCP in UE 401 over the 5GNR RLCs, MACs, PHYs, and the 5GNR links. The 5GNR PDCP in UE 401 transfers this user data to the LTE PDCP for delivery to the user application. The 5GNR PDCP in wireless access node 410 also transfers the LTE portion of the user data to the LTE RLC for delivery to UE 401. The LTE RLC transfers the LTE portion of the user data to the LTE PDCP in UE 401 over the LTE RLCs, MACs, PHYs, and the LTE links. The LTE PDCP in UE 401 transfers the user data from the 5GNR and LTE RLCs to the user application.

During the above user data exchange, the LTE MACs in UE 401 and wireless access node 410 perform HARQ, and the LTE MAC in wireless access node 410 determines the UL and DL LTE HARQ BLERs. The 5GNR MACs in UE 401 and wireless access node 410 also perform HARQ, and the 5GNR MAC in wireless access node 410 determines the UL and DL 5GNR HARQ BLERs. The LTE RLCs in UE 401 and wireless access node 410 perform ARQ, and the LTE RLC in wireless access node 410 determines the UL and DL LTE ARQ BLERs. The 5GNR RLCs in UE 401 and wireless access node 410 also perform ARQ, and the 5GNR RLC in wireless access node 410 determines the UL and DL 5GNR ARQ BLERs. The LTE MAC and RLC transfer their LTE BLER data to the 5GNR PDCP. The 5GNR MAC and RLC transfer their 5GNR BLER data to the 5GNR PDCP.

The 5GNR PDCP selects a new 5GNR/LTE split based on the BLER data. The SGW transfers more user data to the 5GNR PDCP in wireless access node 410 for delivery to UE 401. The 5GNR PDCP in wireless access node 410 splits the user data from the SGW into a new 5GNR portion and a new LTE portion per the new 5GNR/LTE split. In wireless access node 410, the 5GNR PDCP in transfers the new 5GNR portion of the user data to the 5GNR PDCP in UE 401 over the 5GNR RLCs, MACs, PHYs, and the 5GNR links. The 5GNR PDCP in UE 401 transfers this user data to the LTE PDCP for delivery to the user application. The 5GNR PDCP in wireless access node 410 also transfers the new LTE portion of the user data to the LTE RLC for delivery to UE 401. The LTE RLC transfers the LTE portion of the user data to the LTE PDCP in UE 401 over the LTE RLCs, MACs, PHYs, and the LTE links. The LTE PDCP in UE 401 transfers the user data from the 5GNR and LTE RLCs to the user application. The process repeats as more data arrives, more errors are corrected, and the dynamic 5GNR/LTE split is responsively modified.

Figure 7:
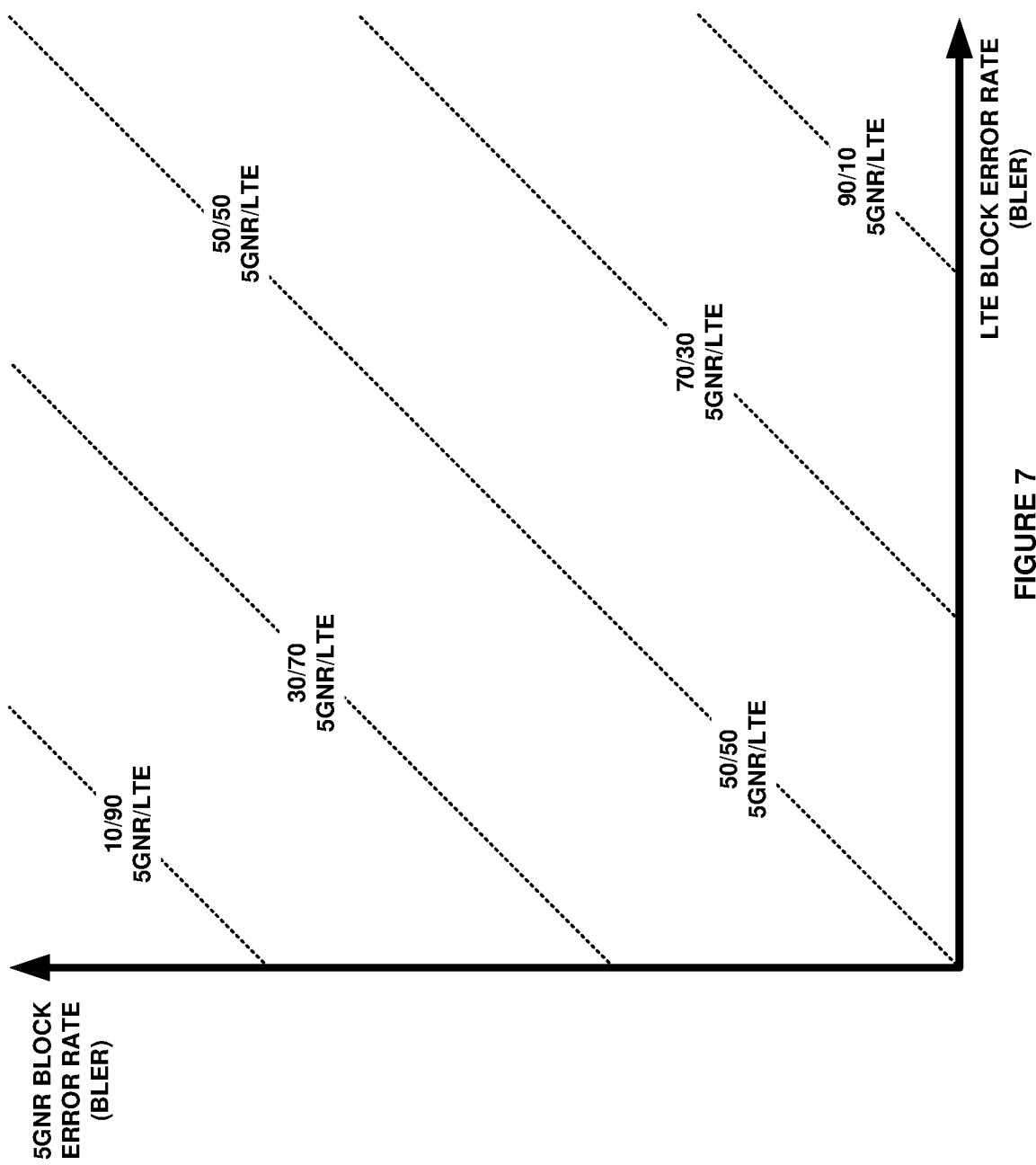
FIG. 7 illustrates a Block Error Rate (BLER) graph to determine the 5GNR/LTE split in the baseband unit in the wireless access node.

FIG. 7 illustrates a Block Error Rate (BLER) graph to determine the 5GNR/LTE split in baseband unit 413 in wireless access node 410. The vertical axis represents 5GNR BLER and the horizontal axis represents LTE BLER. The BLER values may comprise UL BLER, DL BLER, or some combination of UL/DL BLER. As the 5GNR BLER and the LTE BLER converge, the 5GNR/LTE split moves toward 50% 5GNR and 50% LTE. As the 5GNR BLER increases and the LTE BLER remains static or decreases, the 5GNR/LTE split moves toward 10% 5GNR and 90% LTE. As the LTE BLER increases and the 5GNR BLER remains static or decreases, the 5GNR/LTE split moves toward 90% 5GNR and 10% LTE. When the difference between 5GNR BLER and LTE BLER is small, then the 5GNR/LTE split is relatively even. When the difference between 5GNR BLER and LTE BLER grows, then the 5GNR/LTE split increases the 5GNR portion or the LTE portion based on which one has the lower BLER.

The wireless data network circuitry described above comprises computer hardware and software that form special-purpose network circuitry to control the 5GNR/LTE split for wireless UEs based on BLER. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to control the 5GNR/LTE split for wireless UEs based on BLER.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access node to simultaneously serve wireless User Equipment (UE) over Fifth Generation New Radio (5GNR) and Long Term Evolution (LTE), the method comprising:
    a baseband unit receiving user data for delivery to the wireless UE;
    the baseband unit splitting the user data into a 5GNR portion and an LTE portion per an initial 5GNR/LTE split;
    a 5GNR radio wirelessly transferring the 5GNR portion to the wireless UE;
    an LTE radio wirelessly transferring the LTE portion to the wireless UE;
    the baseband unit determining a difference between a 5GNR Block Error Rate (BLER) and an LTE BLER;
    the baseband unit modifying the initial 5GNR/LTE split to a new 5GNR/LTE split based on the difference between the 5GNR BLER and the LTE BLER;
    the baseband unit receiving and splitting additional user data into a new 5GNR portion and a new LTE portion per the new 5GNR/LTE split;
    a 5GNR radio wirelessly transferring the new 5GNR portion to the wireless UE; and
    an LTE radio wirelessly transferring the new LTE portion to the wireless UE.

2. The method of claim 1 wherein the baseband unit modifying the 5GNR/LTE split to the new 5GNR/LTE split based on the difference between the 5GNR BLER and the LTE BLER comprises modifying the 5GNR/LTE split to a more even 5GNR/LTE split when the difference between the 5GNR BLER and the LTE BLER decreases.

3. The method of claim 1 wherein the baseband unit modifying the 5GNR/LTE split to the new 5GNR/LTE split based on the difference between the 5GNR BLER and the LTE BLER comprises modifying the 5GNR/LTE split to a less even 5GNR/LTE split when the difference between the 5GNR BLER and the LTE BLER increases.

4. The method of claim 3 wherein the baseband unit modifying the 5GNR/LTE split to the less even 5GNR/LTE split comprises increasing the 5GNR portion of the split when the 5GNR BLER is lower than the LTE BLER.

5. The method of claim 4 wherein the baseband unit modifying the 5GNR/LTE split to the less even 5GNR/LTE split comprises increasing the LTE portion of the split when the 5GNR BLER is higher than the LTE BLER.

6. The method of claim 1 further comprising:
    the baseband unit correcting errors for the 5GNR portion and responsively determining the 5GNR BLER and the baseband unit correcting errors for the LTE portion and responsively determining the LTE BLER.

7. The method of claim 1 wherein the baseband unit splitting the additional user data into the new 5GNR portion and the new LTE portion per the new 5GNR/LTE split comprises a Fifth Generation New Radio (5GNR) Protocol Data Convergence Protocol (PDCP) splitting the additional user data into the new 5GNR portion and the new LTE portion per the new 5GNR/LTE split.

8. The method of claim 7 wherein the baseband unit splitting the user data into the new 5GNR portion and the new LTE portion per the new 5GNR/LTE split comprises the 5GNR PDCP transferring the new LTE portion to an LTE Radio Link Control (RLC) over a virtual layer in a wireless network Centralized Unit (CU).

9. The method of claim 8 wherein the baseband unit determining the difference between the 5GNR BLER and the LTE BLER comprises a 5GNR Media Access Control (MAC) determining the 5GNR BLER and signaling the 5GNR BLER to the 5GNR PDCP.

10. The method of claim 9 wherein the baseband unit determining the difference between the 5GNR BLER and the LTE BLER comprises an LTE MAC determining the LTE BLER and signaling the LTE BLER to the 5GNR PDCP.

11. A wireless access node to simultaneously serve wireless User Equipment (UE) over Fifth Generation New Radio (5GNR) and Long Term Evolution (LTE), the wireless access node comprising:
    a baseband unit configured to receive user data for delivery to the wireless UE;
    the baseband unit configured to split the user data into a 5GNR portion and an LTE portion per an initial 5GNR/LTE split;
    a 5GNR radio configured to wirelessly transfer the 5GNR portion to the wireless UE;
    an LTE radio configured to wirelessly transfer the LTE portion to the wireless UE;
    the baseband unit configured to determine a difference between a 5GNR Block Error Rate (BLER) and an LTE BLER;
    the baseband unit configured to modify the initial 5GNR/LTE split to a new 5GNR/LTE split based on the difference between the 5GNR BLER and the LTE BLER;
    the baseband unit configured to receive and split additional user data into a new 5GNR portion and a new LTE portion per the new 5GNR/LTE split;
    a 5GNR radio configured to wirelessly transfer the new 5GNR portion to the wireless UE; and
    an LTE radio configured to wirelessly transfer the new LTE portion to the wireless UE.

12. The wireless access node of claim 11 wherein the baseband unit is configured to modify the 5GNR/LTE split to a more even 5GNR/LTE split when the difference between the 5GNR BLER and the LTE BLER decreases.

13. The wireless access node of claim 11 wherein the baseband unit is configured to modify the 5GNR/LTE split to a less even 5GNR/LTE split when the difference between the 5GNR BLER and the LTE BLER increases.

14. The wireless access node of claim 13 wherein the baseband unit is configured to increase the 5GNR portion of the split when the 5GNR BLER is lower than the LTE BLER.

15. The wireless access node of claim 14 wherein the baseband unit is configured to increase the LTE portion of the split when the 5GNR BLER is higher than the LTE BLER.

16. The wireless access node of claim 11 further comprising:
    the baseband unit is configured to correct errors for the 5GNR portion and responsively determine the 5GNR BLER and
    the baseband unit configured to correct errors for the LTE portion and responsively determine the LTE BLER.

17. The wireless access node of claim 11 wherein the baseband unit comprises a Fifth Generation New Radio (5GNR) Protocol Data Convergence Protocol (PDCP) configured to split the additional user data into the new 5GNR portion and the new LTE portion per the new 5GNR/LTE split.

18. The wireless access node of claim 17 wherein the baseband unit comprises the 5GNR PDCP configured to transfer the new LTE portion to an LTE Radio Link Control (RLC) over a virtual layer in a wireless network Centralized Unit (CU).

19. The wireless access node of claim 18 wherein the baseband unit comprises a 5GNR Media Access Control (MAC) configured to determine the 5GNR BLER and signal the 5GNR BLER to the 5GNR PDCP.

20. The wireless access node of claim 19 wherein the baseband unit comprises an LTE MAC configured to determine the LTE BLER and signal the LTE BLER to the 5GNR PDCP.

* * * * *